Jan. 9, 1951   P. SITZER ET AL   2,537,485
CONTROL MEANS
Filed April 28, 1949   2 Sheets-Sheet 1

INVENTORS
PHILIP SITZER
JAMES W. WELSH
BY
Bartlett Eyre Keel & Weymouth
THEIR ATTORNEYS

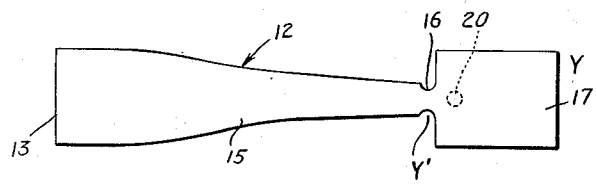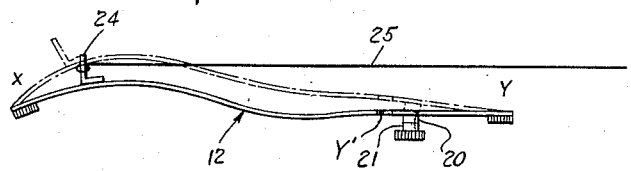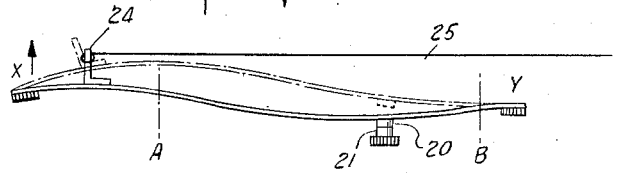

Patented Jan. 9, 1951

2,537,485

UNITED STATES PATENT OFFICE 2,537,485

CONTROL MEANS

Philip Sitzer, Irvington, and James W. Welsh, South Amboy, N. J., assignors to Tung-Sol Lamp Works Inc., Newark, N. J., a corporation of Delaware Application April 28, 1949, Serial No. 90,234

10 Claims. (Cl. 200—113)

This invention relates to thermal controls and particularly to thermal controls of the pull wire type.

More particularly the invention relates to that type of thermal control embodying a constrained buckling vane which is operated by an expansible and contractible wire to control a circuit. When such conventional controls are used to open and close a circuit, as for example intermittently, we have found that the contact pressure is far from uniform during the "on" portion of the cycle. For example, we have found that while the magnitude of the initial contact pressure may be varied by controlling or adjusting some of the variable factors of a unit, yet the shape of the pressure curve remains generally the same in that the pressure between the contacts in the conventional unit is reduced continually and rapidly during the "on" portion of the flashing cycle. In some cases the pressure is actually reduced to an ineffectual value and sometimes to a no pressure condition appreciably sooner than the ending of the "on" portion. This condition may be slightly improved by adjusting certain of the variable factors relatively to each other, such, for example, as the bias angle, the height of the bow, location of contact along the vane, position of the fixed contact with respect to the vane, current or power in pull wire, relationship of the plane of the tail of the vane with respect to the head of the vane, vane thickness, etc. but there is always a substantial drop in the contact pressure toward the end of the "on" position and even such improvement may be accomplished only under particularly critical conditions, making it difficult to obtain uniformity in manufacture.

For example, slight variations in the bow height result in the loss of the slight improvement obtained and this height of bow is critical to a degree that makes it impossible or impracticable to duplicate in production any such slight improvement.

One object of the invention is a novel and improved unit of the above indicated character whose pressure contact is substantially uniform during the whole of the "on" period, thereby rendering the unit more certain in operation to obtain better and more accurate definition of the "on" portion of the cycle.

A further object of the invention is a novel and improved unit of the above indicated character whose desirable characteristics are less dependent upon critical manufacturing and assembly conditions.

Further objects of the invention will hereinafter appear.

For a better understanding of the invention reference may be had to the accompanying drawings forming a part of this application, wherein, Fig. 1 is an elevational view of a unit embodying the invention;

Figure 9:
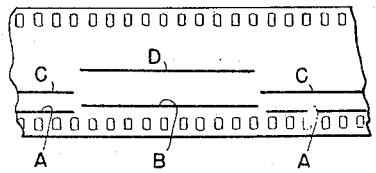
Figure 10:
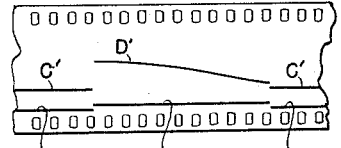

Figs. 9A and 9B schematically illustrate a preferred embodiment of the invention, the vane being shown in exaggerated dimensions for illustration purposes;

Fig. 9 is an oscillogram showing the contact pressure characteristics thereof;

Figs. 10A and 10B are views schematically showing a conventional vane type switch, the vane being shown in exaggerated dimensions for illustration purposes; and Fig. 10 is an oscillogram showing the undesirable contact pressure characteristics thereof.

The problems solved by this invention may best be understood by a brief reference to Figs. 10A and 10B schematically illustrating plan and edge views of a conventional vane type switch on an enlarged scale. The left-hand end 40 of this type vane which is sometimes referred to as the head end, is of generally rectangular shape while the right-hand end 41 of the vane, sometimes referred to as the tail end, is of narrower width than the head end 40 and tapers slightly in width in an inward direction to form a part 42 intermediate the head end 40 and the tail end 41 substantially reduced in width. The head end 40 of the vane is given an upward bias (Fig. 10B), usually by being welded at an upwardly inclined angle at point X while the tail end 41 of the vane is generally fastened to maintain a position generally parallel to the length of the vane as indicated at Y. The vane carries a movable contact 20 which cooperates with a fixed contact 21 to control a circuit containing these contacts. The vane is controlled by a pull wire 25 which at one end is anchored to an L-shaped arm 24 fastened to the vane at a point adjacent point X. The full line position shown in Fig. 10B corresponds to the position when the contacts 20 and 21 are closed, at the beginning, for example, of an "on" period in an intermittently operating switch, the pull wire 25 being contracted and taut. The dotted line position indicates that portion of the cycle when the wire 25 is expanded and the contacts 20 and 21 are open.

Both the full line and dotted line positions are stable positions. In passing from one position to the other the vane must pass through an intermediate or central position which may be called the center of equilibrium. The main buckling portion of the vane is that roughly indicated from A to B and this buckling portion of the vane has a tendency to remain in either the full line or dotted line position and to resist transfer from one position to the other. It exhibits this resistance to transfer until the vane has flexed through the center of equilibrium. At the instant the vane has passed the center of equilibrium it reverses its tendency and projects itself into the other position forcibly, thereby obtaining the desirable snap action in both opening and closing of the contacts. However, notwithstanding these operations the pressure between the contacts 20 and 21 is far from constant during the "on" period. The probable explanation of this undesirable variation in contact pressure is as follows.

When the vane is in the full line position there is a downward component of force at point Y whereas when the vane is in the dotted position there is an upward component of force at Y. The difficulties experienced with this vane have been due, among others, to the vane structure and to the interrelation of the contact position and action and the vane action. Two different but related effects may take place. First, as the vane flexes from the full line position to the dotted position and as it enters the center of equilibrium the pressure between the contacts is substantially reduced as for instance to zero value. This is due to the fact that the contact is of necessity located in that section or part of the vane that is doing the flexing. This likely results in a build-up or lessening of contact resistance which in effect opens or partially opens the circuit even though the vane has not yet snapped through equilibrium and the contacts are still physically closed. A quick response of the pull wire may prevent further action in that direction and the contacts do not open. Instead full contact pressure may be reestablished and the circuit again effectively closed. The resultant effect is a rapid quiver of the current in the circuit or as it is termed, a flutter.

Another effect that also takes place under certain conditions is the welding or sticking of the contacts. All contacts tend to weld together to a greater or lesser degree, when they close an electrical circuit. With the vane of this conventional structure and with the movable contact positioned so that it is caused to open very shortly after the vane has passed the center of equilibrium, and the vane has not yet developed great enough force toward opening the contacts, the sticking or welding of the contacts has an appreciable retarding force. Since the sticking effect is a variable from one closure to another its effect is to cause very erratic behavior on repetitive cycling or flashing. In extreme cases it may even cause failure by preventing the opening of the contacts.

We have found that the operation of a vane type switch may be considerably improved in the above respects by the use of a vane of the structure illustrated in Figs. 9A and 9B showing plan and edge views respectively of the new switch structure. The vane 12 is provided with a head end part 13 of generally rectangular shape, an intermediate portion 15 of tapering or substantially reduced width and a spade-like tail end portion 17. The vane is further provided with a portion Y' which is reduced in width and weakened by the provision of a notch or notches 16 at a point adjacent the inner end of the tail end portion 17. As in Fig. 10B the full line position of the vane 12 represents the contact closed position while the dotted position represents the contact open position when the wire 25 is relaxed as by heating. It is observed that the movable contact 20 is carried by the tail end part 17 of the vane which in the particular embodiment shown is of the same width as the head end rectangular part 13, the contact 20 being carried at a point adjacent the notch or notches 16. With this structure the difficulties in the operation of the conventional vane described above are largely obviated. The pressure between the contacts 20 and 21 in the "on" period remains substantially constant during the period, with the advantages accompanying this operation while also the desirable characteristic of snap action is retained.

The probable explanation of this desirable operation and functioning is as follows.

The indications are that with this new structure very little buckling action occurs in the tail end section 17, namely between the points Y and Y' during the buckling action of the vane in buckling from the "on" position to the open position and going through the center of equilibrium. That is, substantially all of the buckling action takes place in that part of the vane to the left of the reduced or weakened portion Y', while the tail end section, namely the section from Y' to Y remains essentially straight with no appreciable or substantial buckling though the inner end of the tail end part 17 moves up and down with Y as the pivot point. A portion of the section from X to Y', comparable to the section A to B of Fig. 10B on the conventional vane buckles through a center of equilibrium as does section A to B. The notched or weakened portion Y' of 16 forms a very flexible hinge point between the end of the tail end portion 17 and the other portion of the vane. In the full line position there is a downward component of force at the inner end of the section X—Y'. This tends to hold the Y' end of the section 17 down and maintains the contact 20 firmly in engagement with the fixed contact 21. As the main buckling part of the vane, namely the section X—Y' flexes from the full line position toward the dotted position and approaches the center of equilibrium, the downward component of force at Y' maintains the contact pressure. It is only after the buckling part of the vane, X—Y' has passed through the center of equilibrium and is in or approaching the dotted position that the vertical component of force at Y' is reversed and becomes an upward force. This results in the inner end of the tail end section 17 being raised with a snap action to open the contacts. Since, however, this occurs after the vane is definitely past equilibrium, the action is positive and the adverse effects that may and do often occur with the conventional vane are avoided.

Figs. 9 and 10 are copies of actual oscillograms exhibiting certain advantages of the novel and improved structure over that of the conventional structure.

In Fig. 9 we have shown an oscillogram illustrating the superior functioning of the control structure of this invention. In this figure the "curve" A—B indicates the heating current flow, A representing the curve when the current is off and B indicating the period when the current for heating the pull wire 25 is "on." The corresponding curve for the pressure contacts 20 and 21 is shown at C, D with C indicating the complete separation of the contacts 20 and 21 and with D indicating the period when the contacts are closed. The vertical distances between the "curve" D and a continuation of the line C represents the pressures existing between the contacts 20 and 21 at all times throughout the "on" period and it is observed that this line D is substantially parallel with the no pressure "curve" C indicating a substantially uniform contact pressure throughout the "on" period. This functioning is particularly marked when contrasted with an oscillogram shown in Fig. 10 of a conventional sprung vane control. The curves of this Fig. 10 which correspond to the "curves" of Fig. 9 are marked with the letters A', B' and C', D' and it is observed how the contact pressure curve D' during the "on" period assumes a substantial drop toward the end of the "on" period. As indicated above, this "square" or uniform pressure curve D of Fig. 9 is never obtainable in the conventional structure and may be approached only by the extreme critical conditions pointed out above. The indications are that during the "on" period, namely while the wire 25 is being heated and expanded any tendency of change in curvature of the vane 12 on one side of the contact 20 to lessen the pressure between the contacts is compensated by a contrary tendency on the other side of the contact 20 with a possible tendency of the contact 20 to have a slight rocking movement about the fixed contact 21, but whatever the correct theory of operation may be, the illustrated structure has the superior functioning above described. In addition to the superior functioning of the vane of this invention as above described, this structure operates under more critical conditions of current and with greater current loads than is practicable with the conventional structures, and the uniform pressure functioning may be obtained over a considerable variation of the factors above mentioned, simplifying the manufacture and assuring a more uniform product.

Referring to the embodiment of Figs. 1 to 4, we have illustrated the invention as being embodied in a control unit sealed in an evacuated envelope 1 but it is understood that the invention is applicable to controls which are not sealed in an evacuated envelope. The control unit is indicated at 2 and is mounted on a press 3 having secured thereto an exhaust tube 4. The control unit embodies a frame 5 which is mounted on the press 3 by a pair of angle support arms 6 suitably fastened to the frame member 5 and welded to support wires 7 embedded in the press. A pair of spring spacing members 8 are fastened to the frame member 5 near one end and functioned to assist in centering the control unit within the envelope 1.

Figure 1:
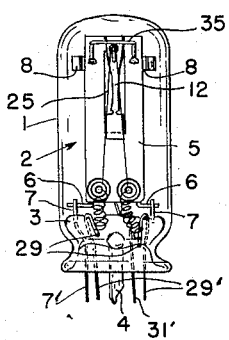
Figure 2:
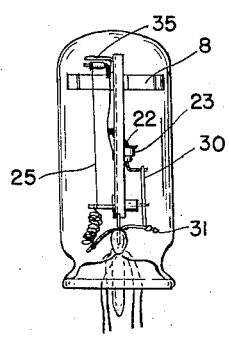
Fig. 2 is a view thereof at right angles to the view in Fig. 1.
Figure 3:
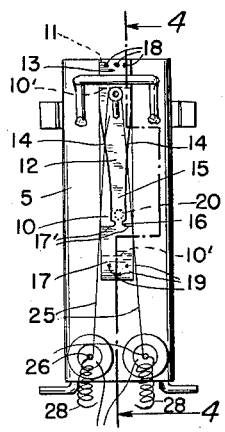
Fig. 3 is an elevational view on an enlarged scale of a part of the device as shown in Fig. 1.
Figure 4:
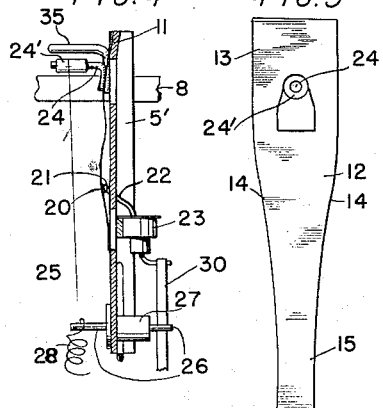
Fig. 4 is a sectional view through a part of the unit along the line 4—4 of Fig. 3.

The frame member 5 is formed of an elongated metallic strip having its edges turned over at an angle to form flanges 5'. This frame member is provided with an elongated rectangular opening 10 and at its upper or outer end is formed with a bearing surface 11 in alinement with the rectangular opening 10 to which the head end of the vane is fastened. This bearing surface is inclined to the plane of the metal frame and in the upper direction to the right, as shown in Fig. 4. The control embodies a vane member designated generally by the numeral 12. This vane is provided with a head part 13 of substantially rectangular shape. From the head end 13 of the vane the latter is tapered in width by means of the taper lines 14 to a point intermediate its length to form a portion 15 of substantially the same uniform width which merges into a reduced width portion 16, this portion 16 being formed by forming notches on each side of the reduced width portion 15. This narrowed portion 16 is adjacent the tail end 17 part of the vane, this tail end portion in the particular embodiment shown, being rectangular and in the form of a spade with the inner edges 17' disposed substantially at right angles to the length of the vane. The head end 13 of the vane is welded to the inclined bearing surface 11, as indicated at 18. The tail end 17 of the vane is fastened by welding to the plain flat surface of the frame member 5 at points adjacent the end 10' of the slot or opening 10 as indicated at 19. In mounting the vane it is put under constraint to form a bow away from the slot or opening 10 and the fastening of the head end of the vane to the inclined bearing surface 11 forms a bias angle which further tends to cause the vane to buckle in an outward direction from the opening 10 when force is applied to the vane to buckle it in opposition to its inherent constraint. The vane carries a movable contact 20 adjacent to or at the reduced portion 16, in the particular embodiment shown this contact 20 being removed a small distance from the reduced portion 16 in the direction of the head end of the vane. In the particular embodiment illustrated this contact 20 is on the side of the vane facing the slot or opening 10 and a contact arm 22 projects through the opening or slot 10 and carries a contact 21 for cooperation with the movable contact 20. The contact arm 22 is insulatedly mounted in a support 23.

In the particular embodiment shown the vane 12 is buckled against the inherent constraint therein by a force applied to an L-shaped arm 24 which has one leg of the L welded to the head end 13 of the vane at a point adjacent or not far removed from the fastened part of the head end of the vane. The pull wire is indicated at 25 and in the embodiment shown this wire is directly heated by the passage of current through the wire instead of being indirectly heated by a separate heating means. The pull wire 25 is therefore insulatedly mounted. It forms a loop around an insulating sleeve 24' disposed on the arm 24 and the two ends of the wire are suitably anchored to a pair of support posts or wires 26 which support wires are firmly and insulatedly mounted on the frame member 5 by the means indicated at 27. These support wires 26 are connected by means of jumper wires 28 to lead-in wires 29. The lead-in wires 29 are connected with the circuit through terminal wires 29', the circuit being omitted for convenience in illustration. The circuit to the movable contact 20 is formed through the lead-in wire 7 and its corresponding terminals 7'. The circuit to the fixed contact is through the jumper wire 30 leading from the contact arm 22 to the lead-in wire 31 which leads to the terminal 31'.

Figure 5:
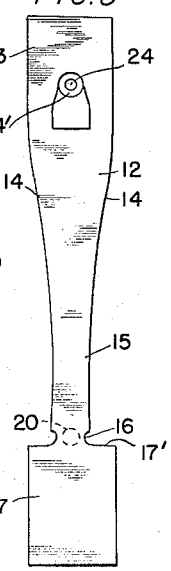
Fig. 5 is an enlarged view of the vane of the unit before mounting.
Figure 6:
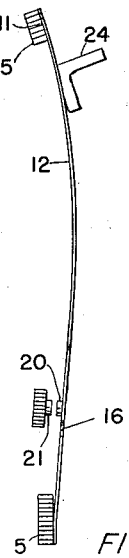
Fig. 6 is a diagrammatic view of the vane as mounted.
Figure 7:
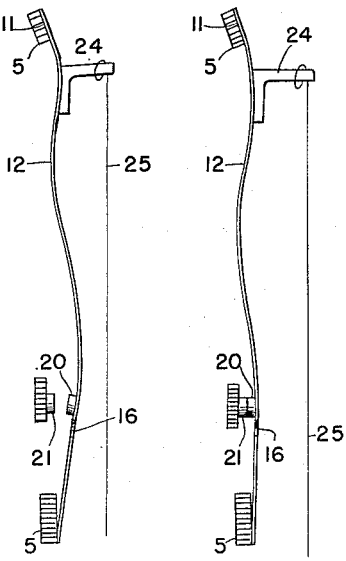
Figs. 7 and 8 are views similar to Fig. 6 showing two different positions of the vane during operation of the unit.
Figure 8:
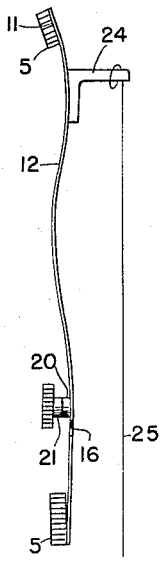

In Fig. 5 the vane 12 is illustrated in exaggerated dimensions. Figs. 6, 7 and 8 are views also of exaggerated length diagrammatically showing the vane 12 in three different positions. Fig. 6 roughly indicates the curvature or bow of the vane 12 when it is first mounted on the frame member 5 to form the bow and the inherent constraint with the pull wires not yet mounted. Fig. 7 illustrates roughly the curvature assumed by the vane 12 in the particular embodiment illustrated herein and with the wire 25 attached and pulling on the arm 24 tending to buckle the vane 12 against its inherent constraint and to close the contacts 20 and 21. This figure is a rough attempt to illustrate the curvature of the vane just before the movable contact 20 is snapped against the fixed contact 21.

Fig. 8 is a rough attempt to illustrate the curvature of the vane 12 immediately after the closing of the contacts 20 and 21 due to the cooling of the wire 25. This represents the "on" period of the cycle which continues until the wire 25 is heated up and expanded sufficiently to permit the inherent constraint of the vane to open the contacts 20 and 21 with a snap action. Both the closing of the contacts and the opening of the contacts are effected in quick snap actions.

With this structure the contacts 20 and 21 are maintained firmly in engagement throughout the "on" period with the pressure sufficient to avoid any tendency to increase the resistance at the contacts 20 and 21 to an undesirable value. Moreover, the pressure between the contacts is maintained at a substantially uniform value with no appreciable variations throughout the "on" period or between the time of snap closure and the time of snap opening. Moreover, this uniform pressure operation may be obtained over a wide range of bow heights, angle biases, etc. or in other words, this desirable operation may be obtained under almost any condition of the variable factors in the unit. For example, the height of the bow of the vane 12 above the plane of the frame member 5 (Fig. 6) may be varied over a considerable range without interfering with the uniform contact pressure conditions desired. Likewise the angle biases determined by the inclined bearing surface 11 may be varied over a considerable range without affecting materially the uniform contact pressure operation. Likewise this desirable uniform contact pressure may be obtained with considerable variations in current or power in the pull wire with variations in the relationship of the plane of the tail of the vane with respect to the head end of the vane, and with variations in vane thickness and while best results are obtained with the contact 20 in the vicinity of the reduced section 16 of the vane, there is a reasonable tolerance in this relative position, and also a reasonable tolerance in the lateral position of the fixed contact 21 with respect to the vane. Thus this desirable contact pressure operation may be obtained under noncritical conditions with resultant improvement in manufacturing and production conditions.

In the particular embodiment shown the ends of the vane are illustrated as fastened to substantially co-planar parts of the frame member 5 except that the part 11 is inclined for the above indicated reasons, but it is understood that these parts may not be co-planar and that the bias angle of 11 may be varied from that shown. The member 35 functions as a stop for the arm 24, 24' so as to ease up on the pull of the wire 25 by the vane if the vane should be heated up sufficiently to approach the rupturing strength of the wire.

We claim:

1. In a thermal control of the sprung vane type, a frame member, a vane mounted thereon so as to have an inherent constraint and having ends of predetermined widths, an intermediate section of narrower width and a short section between one end and the intermediate section of substantially less width than the latter, thermally controlled power means opposing the inherent constraint of the vane and a circuit controlled by the buckling of the vane under the influence of the thermal power means including a contact carried by the vane and secured thereto in the vicinity of said short section.

2. In a control, a frame element, a sprung vane fastened to said frame at its ends and having portions adjacent the fastened ends of predetermined widths, an intermediate portion of narrower width, and a short weakened section between the intermediate section and an end portion, thermal power means for buckling the vane against the inherent constraint and a fixed contact in a control circuit located in the vicinity of said weakened section of the vane and control means carried by the vane at said weakened section of the vane and cooperating with the fixed contact.

3. In a control, a frame member, an elongated vane fastened at its ends to the frame so as to have an internal constraint, said vane having a portion of predetermined width adjacent the head end thereof which portion is tapered to an intermediate portion of narrower width, said intermediate portion merging into a short section of still further reduced width and a rectangular section at the tail end of a width substantially greater than that of the intermediate section, a contact carried by the vane at a point in the vicinity of said reduced section which cooperatively functions with a fixed contact to control a circuit and an expansible pull wire in operative engagement with the vane adjacent the head end to buckle the vane against the inherent constraint and actuate said contact carried by the vane to engage and disengage the relatively fixed contact.

4. In a thermal control, a frame member, an elongated vane having end parts of substantially uniform widths and fastened at its ends to said frame in a manner to assume a predetermined bow with the vane inherently constrained to maintain the bow, said vane comprising adjacent one end thereof a portion of substantial width, said portion merging abruptly into a relatively weakened portion near the other end, a control circuit contact mounted in the path of a portion of the vane located in the vicinity of the relatively weakened portion and thermally controlled power means operatively connected with said vane and buckling the vane against its inherent constraint to open and close a circuit at said contact.

5. In a control, a frame member, an elongated vane fastened to said frame member so as to set up an inherent constraint tending to maintain the vane in bow form, said vane having a relatively wide portion at one end, a relatively narrow portion intermediate its ends with the vane tapering in width from the relatively wide portion to a relatively narrow portion, the opposite end of said vane being of rectangular shape and of a width substantially greater than that of intermediate section and joined to the intermediate section of narrower width by means of a short section of less width than that of the intermediate section, a fixed contact dipsosed in the vicinity of said short section so as to be engaged in one position of the vane by a portion thereof in the vicinity of the short section, and power means in operative engagement with the vane at a point adjacent the first mentioned end for buckling said vane against the inherent constraint therein and causing said vane to engage and disengage said fixed contact.

6. In a control, a frame member, an elongated vane fastened to said frame member so as to set up an inherent constraint tending to maintain the vane in bow form, said vane having a relatively wide portion at one end, a relatively narrow portion intermediate its ends with the vane tapering in width from the relatively wide portion to a relatively narrow portion, the opposite end of said vane being of rectangular shape and of a width substantially greater than that of intermediate section and joined to the intermediate section of narrower width by means of a short section of less width than that of the intermediate section, said short section being formed by notches on opposite sides of the vane, a fixed contact disposed in the vicinity of said short section so as to be engaged in one position of the vane by a portion thereof in the vicinity of the short section, and power means in operative engagement with the vane at a point adjacent the first mentioned end for buckling said vane against the inherent constraint therein and causing said vane to engage and disengage said fixed contact.

7. In a thermal control of the sprung vane type, a frame member, a vane mounted thereon so as to have an inherent constraint and vane ends of predetermined widths, said vane tapering in width from one end to form an intermediate section of gradually narrowing width, the opposite end of the vane being of substantially greater width than any portion of the intermediate section and said last named end section being joined to the intermediate section by a short section of narrower width than the narrowest part of the intermediate section, a contact carried by the vane at a point in the vicinity of the short section and a thermally controlled power means opposing the inherent constraint of the vane.

8. In a thermal control of the sprung vane type, a frame member, a vane mounted thereon so as to have an inherent constraint and vane end portions of predetermined widths, said vane tapering in width from one end portion to form an intermediate section of gradually narrowing width, the opposite end portion of the vane being of substantially greater width than any portion of the intermediate section and said last named end portion being joined to the intermediate section by a short section of narrower width than the narrowest part of the intermediate section, a contact carried by said last named end portion at a point in the vicinity of the short section and a thermally controlled power means opposing the inherent constraint of the vane.

9. A thermal circuit control device of the sprung vane type comprising a frame member and a vane mounted thereon so as to have inherent constraint tending to buckle the vane in one direction, said vane having comparatively short ends of generally rectangular shape, one of said ends gradually tapering in width to a point adjacent the other end and a short section joining the latter end in the tapered part which has a substantially lesser width than any portion of the tapering portion and a contact carried by the last named end adjacent said short section.

10. A thermal control device of the character set forth in claim 9 wherein both ends of the vane are of approximately equal widths.

PHILIP SITZER.
JAMES W. WELSH.

REFERENCES CITED

The following references are of record in the file of this patent:

UNITED STATES PATENTS

| Number | Name | Date |
|---|---|---|
| 2,133,309 | Schmidinger | Oct. 18, 1938 |
| 2,388,712 | Schmidinger | Nov. 13, 1945 |
| 2,429,784 | Whitted | Oct. 28, 1947 |